Oct. 21, 1930.  R. E. MONJOUSTE  1,778,906
AIRCRAFT
Filed Oct. 11, 1929   3 Sheets-Sheet 1
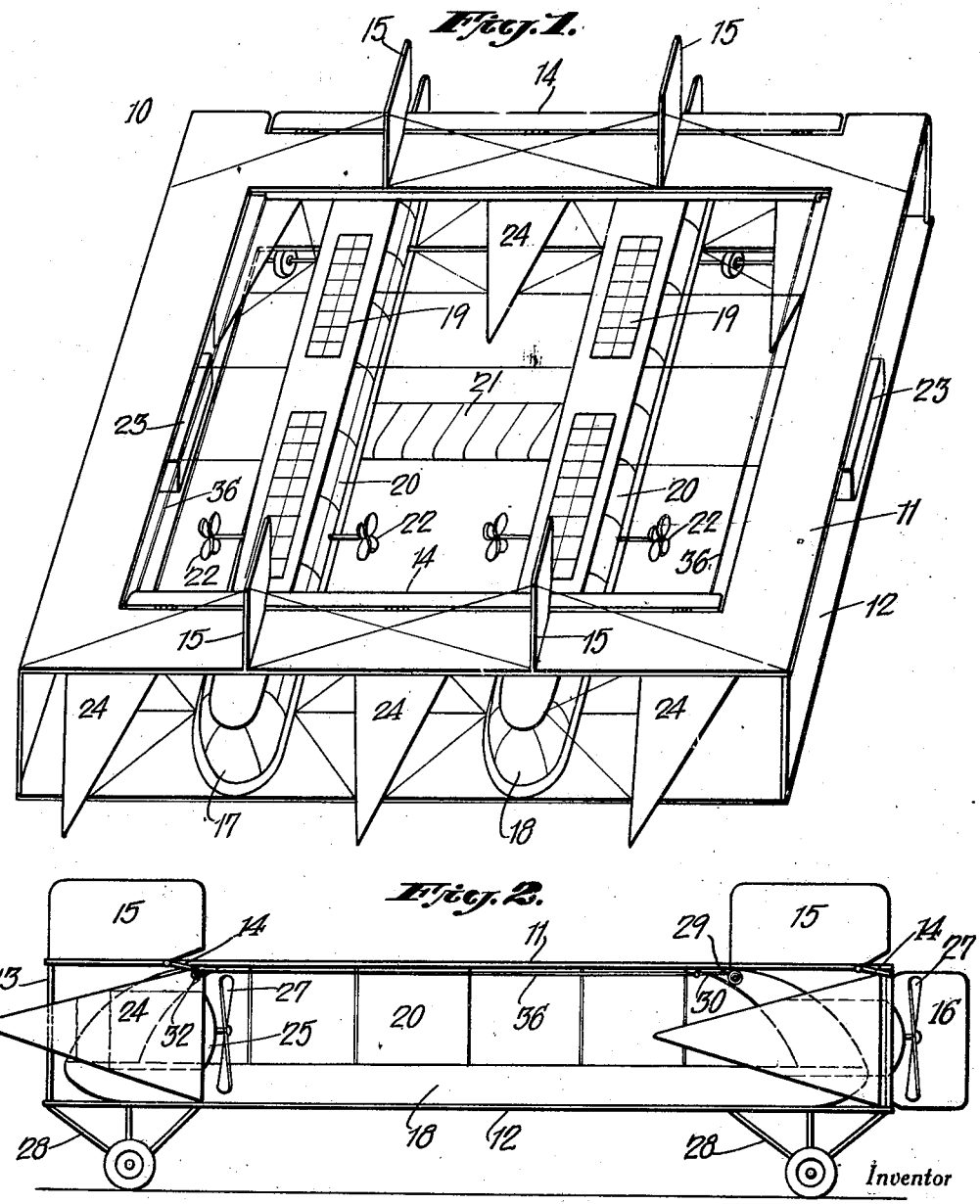
Inventor
RENE E. MONJOUSTE.
By Clarence A. O'Brien
Attorney Oct. 21, 1930.  R. E. MONJOUSTE  1,778,906
AIRCRAFT
Filed Oct. 11, 1929  3 Sheets-Sheet 2
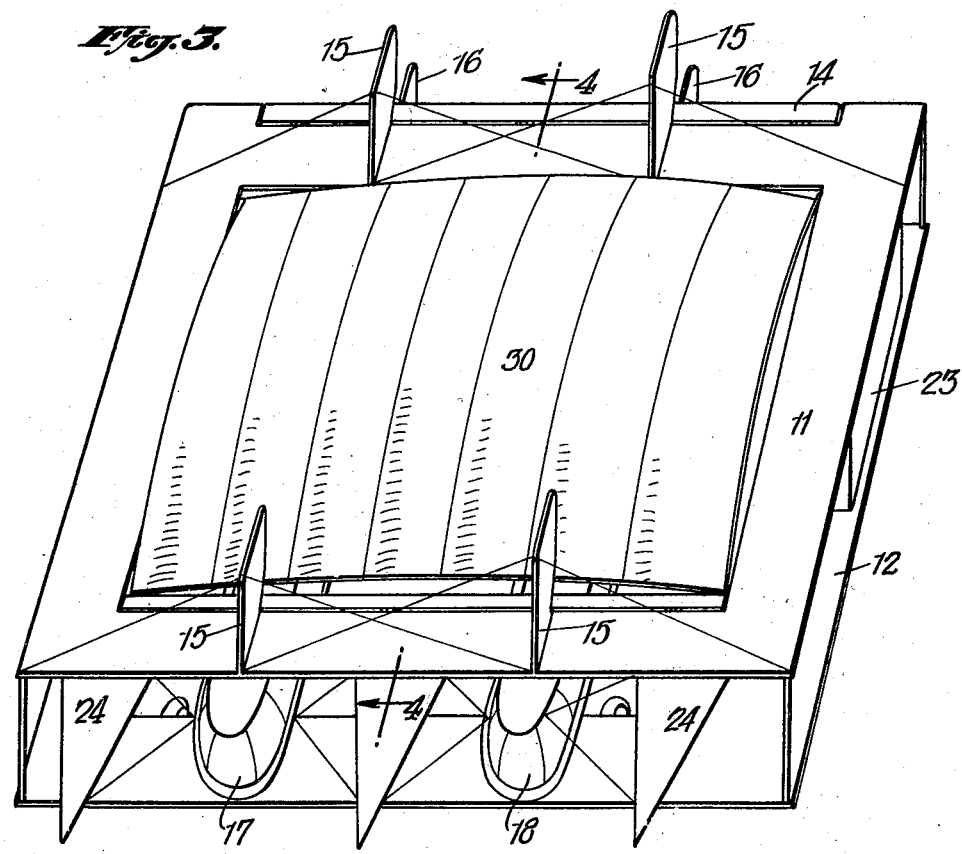
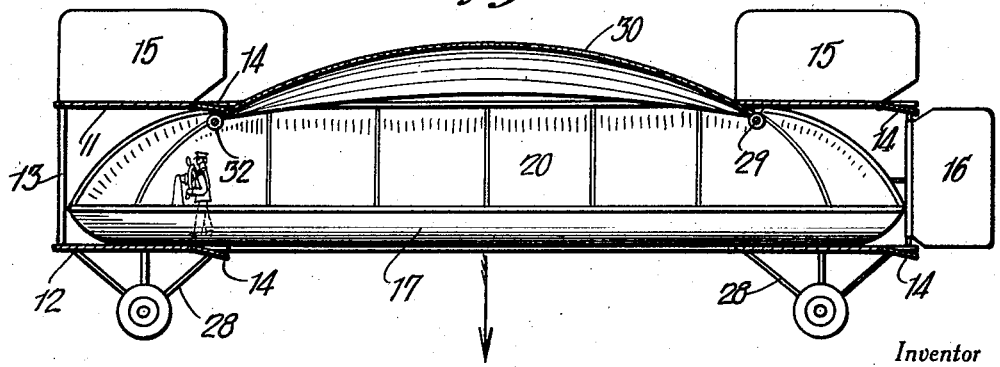
Inventor
RENE E. MONJOUSTE.
By Clarence A. O'Brien.
Attorney Oct. 21, 1930.  R. E. MONJOUSTE  1,778,906
AIRCRAFT
Filed Oct. 11, 1929  3 Sheets-Sheet 3
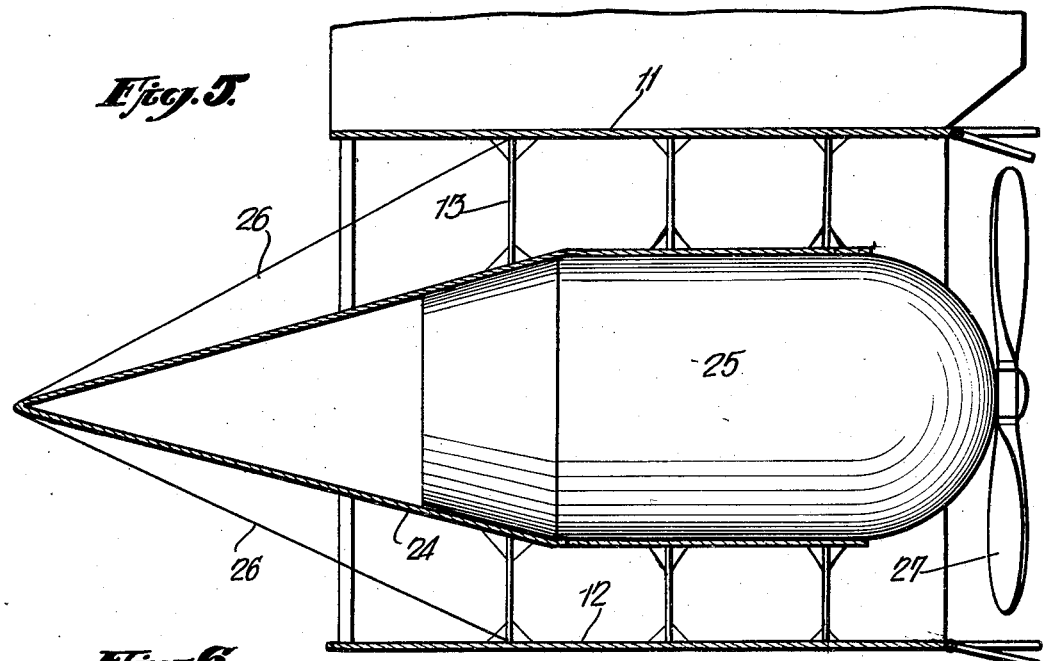
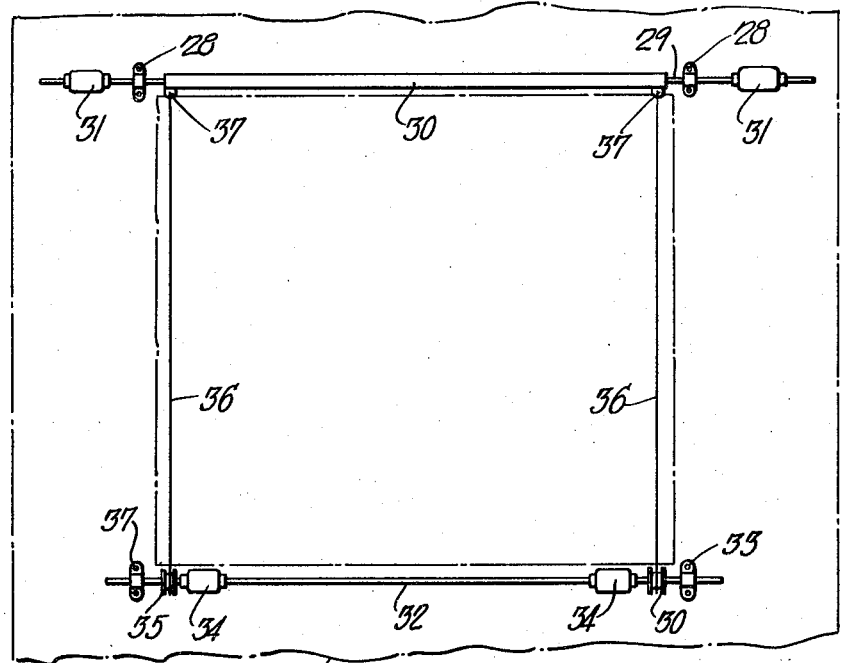
Inventor
RENE E. MONJOUSTE.
By Clarence A. O'Brien
Attorney Patented Oct. 21, 1930

1,778,906

UNITED STATES PATENT OFFICE

RENE ESTREM MONJOUSTE, OF NEW YORK, N. Y.

AIRCRAFT

Application filed October 11, 1929. Serial No. 398,984.

This invention relates to improvements in aircrafts and more particularly to the heavier than air type.

The primary object of the invention resides in a passenger carrying aeroplane designed to increase the safety of the craft in flight and in landing, it being understood that the weight of aeroplanes of this type adds to the danger in effecting a safe and smooth landing under certain conditions.

Another object is the provision of an aeroplane embodying a square or rectangular shaped wing structure, and a flexible sheet normally in a rolled up position, but movable to a position to span the space within the confines of the wing when landing, the same acting as a resistance to gradually ease the descent of the craft when the propelling motors have been shut off.

A further object is to provide an air craft for passenger service and which is constructed to meet the comforts and pleasure of the passengers.

A still further object is to provide a conical shield or casing about the propelling motors to reduce the head resistance and to protect the driving propellers thereagainst.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a perspective view of my improved air craft showing the flexible sheet in a rolled up or inoperative position.

Figure 2 is a side elevational view of the same.

Figure 3 is a view similar to Figure 1 but showing the flexible sheet in an operative or extended position.

Figure 4 is a vertical longitudinal sectional view on the line 4—4 of Figure 3.

Figure 5 is an enlarged detail sectional view through one of the motor casings.

Figure 6 is a top plan view showing the means actuating the flexible sheet to an operative and inoperative position.

Referring to the drawings by reference characters, the numeral 10 designates my improved air craft in its entirety and which is of the biplane type and includes an upper and lower rectangular or square shaped wing structures 11 and 12 suitably spaced by a similar shaped frame structure 13 and having central openings therein. The front and back portions of the upper and lower frame structures are provided with the usual ailerons 14 while rising from the upper frame structure are fins or stabilizers 15, the lower wing structure 12 and adjacent portion of the upper wing structure having rudders 16 journaled therein for the steering of the craft. Any system of control for the rudders 16 and ailerons may be provided and it is not believed necessary to elaborate on this construction.

Extending fore and aft of the wing structure and interposed between the upper and lower wings are cabin structures 17 and 18 respectively disposed at even distances from the longitudinal center of the wing. These cabin structures may house the passengers and members of the crew and may contain a pilot's room and chart room at the forward end thereof from which the craft may be navigated. The roof of the cabin structures 17 and 18 are provided with glass windows 19 while the sides of the same are similarly provided with transparent windows 20 for the purpose of admitting light to the interior of the cabin and for the convenience of the passengers in viewing the surrounding scenery. An enclosed bridge 21 spans the two cabin structures 17 and 18 approximately midway between their ends for the purpose of establishing communication between the two cabins. Propellers 22 extend from the opposite sides of the cabin structures to increase the stability of the craft and may be driven in any suitable manner. The opposite sides of the wing structure intermediate the upper and lower wings support tanks 23 for the storage of water and fuel and are disposed so as to equalize the weight on opposite sides of the axial center of the machine.

Mounted between the upper and lower wing structures both fore and aft, are conical shaped casings 24, having their pointed ends facing in a forward direction while the enlarged open ends face rearward, and which casings serve to house the propelling motors 25. The conical casings 24 are rigidly mounted in the frame work 13 and may be reinforced by cables or guy wires 26 which have one end connected to the frame structure and their other ends to the pointed end of the motor housing. The driving propellers 27 are fixedly mounted to the motor shaft and are disposed just beyond the open ends of the casing as clearly shown in Figures 2 and 5 of the drawings so that the tip ends of the propeller extend beyond the sides of the casing. It will be understood that as the air craft is flying in a forward direction the headwinds or air resistance upon the motors is greatly decreased without interfering with the efficiency of the propellers.

The underside of the craft is provided with suitable landing gears 28 at the forward and rear ends of the same and when used as a land craft, the landing gear may include the usual wheels while for a water craft the same may be provided with pontoons.

Journaled in bearings 28' provided on the under side of the upper wing structure 11 at the front side thereof is a roller 29 to which one end of a flexible sheet 30 is fixedly attached and which sheet is of a width and length to span the open space within the confines of the upper wing structure. Electric motors 31 are operatively connected to the roller 29 to impart winding and unwinding movement to the strip 30. Also fixed to the underside of the upper wing structure directly opposite the side on which the roller 29 is journaled is a shaft 32 journaled in bearings 33 and driven by electric motors 34. The shaft 32 carries winding spools or reels 35 to which one end of cables 36 are fixedly connected, the opposite ends of the cable being attached to the free edge of the flexible strip 30 as at 37. It will thus be seen that when the craft is descending to make a landing, and the flexible strip 30 is in a wound up condition on the shaft 29 that by starting the motors 31 and 34, the flexible strip will be unwound from the roller 29 and pulled in a rearward direction across the space by the cables 36 winding on the reels 35. When the strip 30 has been fully unwound to space the area within the confines of the top wing structure, the same acts in the same capacity as a parachute in building up a resistance to cause the craft to glide smoothly and gradually to the surface of the earth. The motors 31 and 34 may be of the reversible type so that the flexible strip or sheet 30 may be rewound upon the roller after a landing has been effected.

While I have shown what I deem to be the most desirable embodiment of my invention, I wish it to be understood that various changes in construction may be made if desired without in any way departing from the spirit of my invention, and I therefore do not limit myself to the exact details shown and described, nor to anything less than the whole of my invention, limited only by the appended claims.

Having thus described the invention, what I claim as new and desire to secure by Letters Patent is:—

1. In an air craft, spaced upper and lower rectangular shaped wings, and cabin structures mounted between said upper and lower wings and disposed parallel to opposite sides thereof, and a bridge spanning said cabin structures for establishing communication between the same.

2. In an air craft, spaced upper and lower rectangular shaped wings having a central opening, and cabin structures mounted between said upper and lower wings and disposed parallel to opposite sides thereof, a roller journaled on one side of said upper wing, a flexible sheet having one end fixed to said roller, and means for pulling upon the free end of said sheet to extend the same to span the space within the confines of the upper wing structure to close said opening.

3. In an air craft, a frame structure, spaced upper and lower wings of square configuration in plan supported by said frame structure having central openings therein, spaced parallel cabin structures disposed between front and rear portions of said upper and lower wings and extending parallel to the sides of the same.

In testimony whereof I affix my signature.

RENE ESTREM MONJOUSTE.